May 2, 1939.  E. FISCHEL  2,156,976
CONTROL APPARATUS FOR VEHICLES
Filed Dec. 7, 1937  2 Sheets-Sheet 2
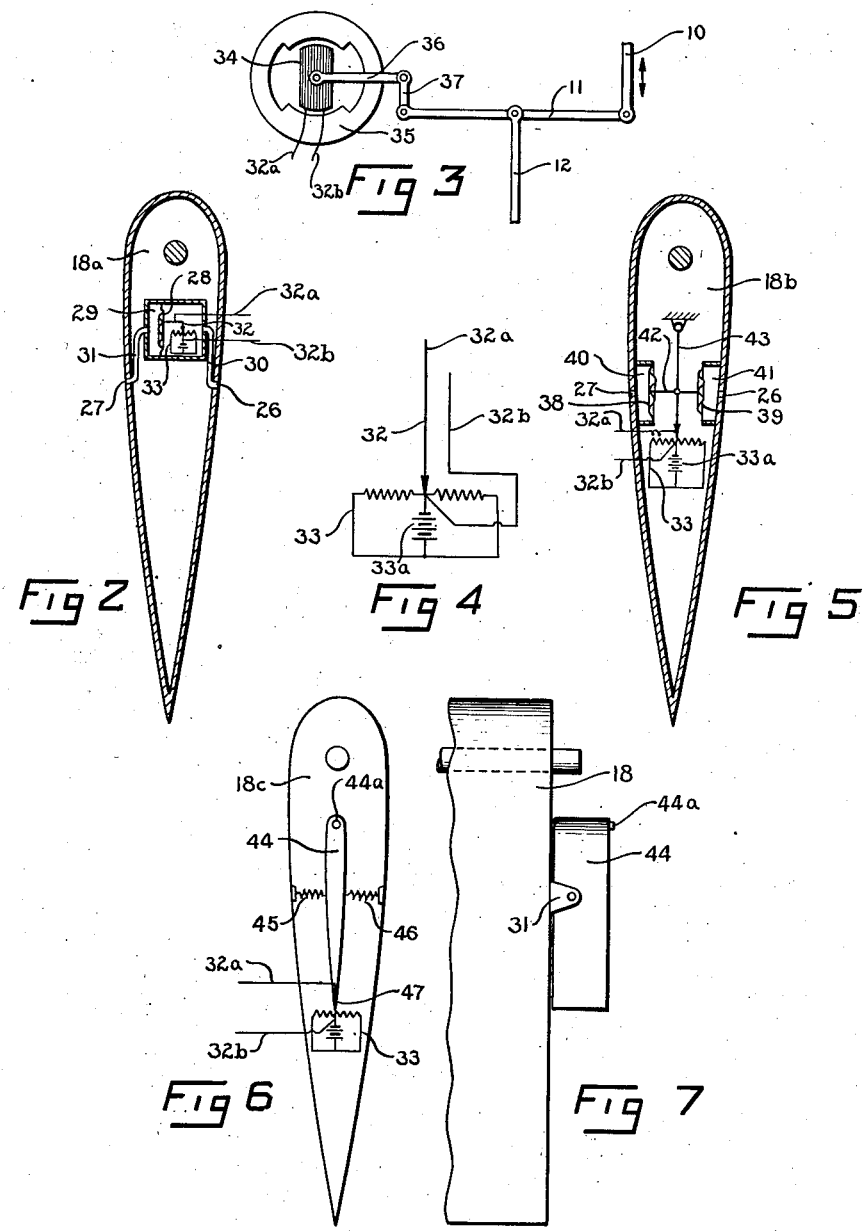
INVENTOR.
Eduard Fischel
BY
Stephen Cerstvik
ATTORNEY.

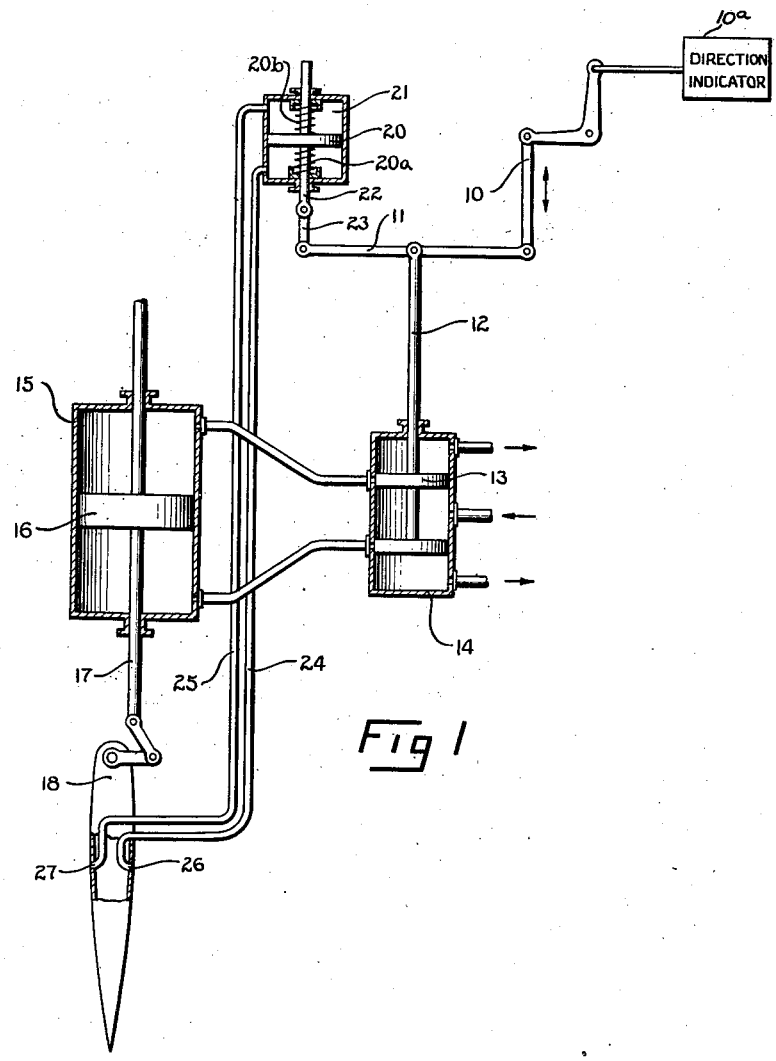

Patented May 2, 1939

2,156,976

UNITED STATES PATENT OFFICE 2,156,976

CONTROL APPARATUS FOR VEHICLES

Eduard Fischel, Berlin-Charlottenburg, Germany, assignor to Siemens Apparate und Maschinen Gesellschaft mit beschränkter Haftung, Berlin, Germany, a corporation of Germany Application December 7, 1937, Serial No. 178,592
In Germany November 21, 1936

2 Claims. (Cl. 244—75)

This invention relates to control apparatus for vehicles and more particularly to automatic pilot means for aircraft or marine vessels.

In automatic pilot or steering control devices heretofore proposed for marine vessels and aircraft wherein deviation from the prescribed course is met by a compensating control surface displacement which is a function of the control force or force necessary to move the rudder, it has been intended that the displacement also be a function of the return moment or the turning moment necessary for returning the vehicle to the prescribed course. However, this intention is not fulfilled in all cases because the force necessary to move the rudder when the vehicle is in motion is a co-function of said turning moment only when the control surface or the rudder is statically stable. A control surface or rudder is regarded as statically stable when, upon displacement from the normal position, the opposing moment necessary to be overcome constantly increases as a function of the displacement. This opposing moment, in certain types of craft, may become of such magnitude that it cannot be overcome by the pilot. For this reason, means have been provided for reducing said moment comprising, for example, equalizing control surfaces attached to or forming a part of the main control surface. These equalizing surfaces have the effect of reducing the static stability of the rudder such that the control force and hence the compensating control surface displacement is no longer a co-function of the turning moment necessary to return the vehicle to the predetermined course.

One of the objects of the present invention is to provide novel control means of the above character wherein the compensating displacement of a statically unstable control surface is a function of the turning moment necessary for returning the vehicle to a prescribed course.

Another object of the invention is to provide novel automatic control means of the above character wherein the turning moment necessary to return the vehicle to a predetermined course is accurately produced.

A further object is to provide novel control means for aircraft, marine vessels and the like, which will quickly correct course deviations by an accurate turning moment produced by the rudder whether the rudder be statically stable or not.

An additional object is to provide novel vehicle control means wherein a pressure gauge measures the pressure acting upon the control surfaces and controls the extent of the displacement thereby.

A further object is to provide novel automatic pilot means which are responsive to the pressure of the flowing medium acting upon the control surface.

The above and further objects and novel features of the invention will more fully appear when the same is read in connection with the accompanying drawings. It is to be expressly understood, however, that the drawings are for the purpose of illustration only and are not intended to define the limits of the invention, reference being had primarily for this latter purpose to the appended claims.

In the drawings, wherein like reference characters refer to like parts throughout the several views, Fig. 1 is a schematic diagram of one embodiment of the invention;

Fig. 2 is a cross-sectional view of a control surface showing schematically a second embodiment of the present invention;

Fig. 3 is a schematic diagram of one form of rotary magnet and differential which may be employed in the present invention;

Fig. 4 is a wiring diagram of one form of potentiometer switch which may be employed in the present invention;

Fig. 5 is a cross-sectional view of a control surface illustrating schematically a third embodiment of the present invention;

Fig. 6 is a top elevation showing schematically a fourth embodiment of the invention; and, Fig. 7 is a side elevation of the embodiment shown in Fig. 6.

The form of the invention illustrated in the accompanying drawings by way of example is an automatic course control device for aircraft, the same being constituted by a direction indicator or control transmitter which, by suitable connections, controls a servo-motor in cooperation with pressure gauging means which measures at the control surface the fluid pressure differential between opposite sides thereof. The pressure gauge is so connected to the servo-motor that said pressure differential is one of the factors in controlling the amount of the control surface displacement. The control surface pressure differential is always a function of the proper return moment regardless of the static stability of said surface. Therefore, in order to automatically control said surface to produce accurate return moments, the pressure differential must be continuously measured and means provided for governing the displacement of the control surface in accordance therewith. The return moment is a function of the speed and mass of the vehicle and consequently the control surface pressure differential will be a similar function and the means for measuring this differential and for governing the displacement of the control surfaces thereby are provided.

One embodiment of the present invention is illustrated in Fig. 1 wherein novel means are provided to govern the control surface displacement not only in accordance with the course deviation of the craft but also by the actual moment or force required to turn the craft under the existing operating conditions which may vary widely. Said means, in the form shown in Fig. 1, comprise a direction control transmitter 10a which is suitably connected to an arm 10 which is pivotally connected to a differential lever 11. A valve rod 12 is articularly connected to said lever and governs, for example, a hydraulic servo-motor control valve 13 within cylinder 14. Said valve in turn governs the fluid which actuates servo-motor 15. A piston 16 and a piston rod 17 of said motor are operably connected to a control surface 18. In order to continuously measure the control surface pressure differential and to convert same into an impulse which will be an accurate function of the return moment and which will cooperate with the direction control transmitter to govern the servo-motor 15, a pressure responsive piston arrangement connected by conduits directly to the control surface is provided comprising a piston 20 within cylinder 21. Said piston, in the form shown, is provided with a piston rod 22 which by means of an arm 23 is linked to the extremity of lever 11 opposite the direction control transmitter arm 10. Piston 20 is normally held in a centralized position by springs 20a and 20b which may be concentric with rod 22. The cylinder chambers on opposite sides of said piston are connected by suitable conduits 24, 25 to opposite sides of the control surface 18 where, through openings 26 and 27 therein, respectively, is measured continuously the fluid pressure acting thereon, said pressure being transmitted to the control pressure gauge 21 which as above mentioned governs the servo-motor.

In the operation of this embodiment, assume that the vehicle, for example, an aircraft, is in flight upon a steady course and that the automatic pilot is inoperative and in a centralized condition; now assume that a sudden course deviation occurs which causes the direction control transmitter to thrust arm 10 downwardly and thus move in the same direction the control valve 13. Immediately fluid under pressure will move the servo-motor piston 16 downwardly and cause the control surface 18 to be displaced to the left. The return of the control valve 13 to the inoperative position does not depend upon the control force or upon the pressure necessary to displace the surface 18, but instead depends upon the pressure differential existing between the opposite sides thereof and therefore upon the return moment, since the pressure differential and the return moment are co-functional. This pressure differential is communicated to cylinder 21 through conduits 24, 25 and hence causes the working pressure upon piston 20 also to be a function of said moment. When the pressure differential has reached a point indicative of a proper turning moment at the control surface, the tension of springs 20a and 20b is overcome and piston 20 is displaced a sufficient amount to return control valve 13 to an inoperative position by means of lever 11. Consequently, the control surface will be displaced as a function of said pressure differential.

A second novel embodiment of the invention is composed of the control surface 18a shown in Fig. 2 which is substituted for the surface 18 of Fig. 1. Associated with surface 18a in the second embodiment is the rotary magnet arrangement shown in Fig. 3 which is substituted for the pressure responsive piston means 20, 21 of Fig. 1 and which is governed by means associated with surface 18a in a manner to appear hereinafter. This embodiment is similar in principle to the first in that a control surface pressure differential governs the displacement of said surface in cooperation with a direction control transmitter. It is also similar in construction to the first embodiment with the exception that instead of permitting the pressure differential mechanically to actuate the control lever 11 by means of a pressure responsive piston arrangement, the pressure differential is converted into an electrical impulse which, for example, actuates a rotary magnet which in turn governs said lever in cooperation with the direction control transmitter.

Novel means are provided for measuring said differential and converting the same into an electrical impulse comprising a pressure responsive membrane 28 within a suitable chamber 29 which is built into the control surface. Spaces in the chamber on opposite sides of said membrane are in communication with opposite sides of the control surface by means of conduits 30, 31. It is seen that the membrane will be distorted in accordance with the control surface pressure differential. In order to convert said differential into an electric impulse, a potentiometer contact arm 32, which is normally held in a centralized inoperative position upon potentiometer 33, is displaceable by said distortion and allows a current to flow from energy source 33a over leads 32a and 32b to an armature 34 of a rotary magnet 35. Armature 34 is operably connected to differential lever 11 by linkage 36, 37. The magnitude of said current will be a function of the control surface pressure differential and will displace armature 34 and govern the control surface displacement accordingly.

A third embodiment is composed of control surface 18b shown in Fig. 5 which is substituted for surface 18 of Fig. 1. Also associated with surface 18b is the rotary magnet arrangement of Fig. 3 which is employed here as in the second embodiment. This form of the invention is similar to the second embodiment in principle and construction with the exception that not one but two membranes 38 and 39 within chambers 40, 41, respectively, are employed, each responsive to the pressure acting upon a side of the control surface. Said membranes are interconnected by an arm 42 which controls the position of a pivotally mounted contact arm 43 upon potentiometer 33 which controls a rotary magnet in a manner similar to that of the second embodiment.

In the operation of the second and third embodiments, when the craft deviates from its predetermined course, the course transmitting means 10a (Fig. 1) will move control arm 10 and lever 11 from the inoperative position and will cause the servo-motor to displace the control surface 18a or 18b. The pressure differential existing on opposite sides of said surface is zero when in the fore-and-aft position, however, upon displacement a differential occurs which will cause a distortion of the membrane arrangement which in turn will displace the contact arm 32 or 43 from the centralized position an amount which is a function of said differential. A current will be caused to flow to rotary magnet armature 34, proportional to said displacement, and will govern the return motion of control valve 13 accordingly. Therefore, it is seen that the amount of displacement of surface 18 is dependent upon the pressure differential at said surface which in turn is dependent upon the proper return moment for course correction.

A fourth embodiment of the invention is composed of control surface 18c shown in Figs. 6 and 7 which, as in the second and third embodiments, is substituted for surface 18 of Fig. 1. The rotary magnet means of Fig. 3 also is substituted for the pistons arrangement 20, 21 of Fig. 1. As above stated, one of the objects of the invention is to provide novel means for automatically displacing a control surface in accordance with the return moment necessary to correct a given course deviation, regardless of whether said surface be statically stable or unstable. It has been shown that only for statically stable rudders is the control force a function of said return moment. This control force is a measure of the counteracting pressure upon the control surface which resists the displacement thereof from the centralized position. It is pointed out that if the displacement of a statically unstable surface were controlled by a counteracting pressure upon a statically stable auxiliary surface coupled thereto in a suitable manner the same result would be obtained as in the statically stable surface governed by the control force acting thereon. In the fourth embodiment a statically stable auxiliary control surface 44 is mounted upon and governs the amount of displacement of the main surface 18c, which may be statically unstable. Surface 44 is pivotally mounted upon rudder 18c at 44a and is normally held in a centralized position thereon by means of springs 45, 46 and is adapted for movement as a function of the counteracting pressure acting on said auxiliary and hence as a function of the control force therefor. This movement is converted into a corresponding electric impulse by means of potentiometer 33 connected, as before, to an energy source 33a and a contact arm 47 which is attached, for example, to the after extremity of surface 44 for movement therewith. This electric impulse controls rotary magnet 34, 35 and the servo-motor control valve 13 in a manner as set forth for the second and third embodiments.

In the operation of the fourth embodiment, a course deviation of the craft, as above explained, will alter the centralized position of the control valve 13 and cause the servo-motor to produce a compensating displacement of the control surface. The return of the control valve to the inoperative position and hence the amount of the compensating rudder displacement is dependent upon the counteracting pressure acting against the statically stable auxiliary surface 44. When the pressure has reached a point indicative of a proper turning moment at said auxiliary control surface, the tension of springs 45, 46 is overcome and said surface moves contact arm 47, attached thereto, a corresponding amount which in turn permits an electric current to flow also corresponding in magnitude to said turning moment. The rotary magnet 35 accordingly will be energized and will return the valve 13 to the inoperative position.

There is thus provided a novel course control device for vehicles wherein the corrections for course deviations are functions of the proper turning moment required to return the vehicle to the prescribed course. The device is simple in construction and is adapted for long use without repair. It is light in weight and is also adapted for installation within the limited space available, for example, aboard aircraft.

Although four embodiments of the invention have been illustrated and described in detail, it is to be expressly understood that the invention is not limited thereto. For example, in the form shown electric instead of hydraulic servo-motor means could be employed. Also, solenoid means instead of rotary magnet means could be employed in the last three embodiments. Various changes may also be made in the design and arrangement of parts illustrated without departing from the spirit and scope of the invention, as will now be understood by those skilled in the art. For a definition of the limits of the invention, reference will be had primarily to the appended claims.

What is claimed is:

1. In apparatus of the class described, a control surface, a servo-motor, an auxiliary control surface mounted upon said first surface, and means for governing said servo-motor in accordance with the movements of said auxiliary surface.

2. In apparatus of the class described, direction indicating means, a main control surface, a servo-motor for said surface, an auxiliary control surface associated with said main surface, resilient means for retaining said auxiliary surface in a predetermined position relative to said main surface, and means for controlling said servo-motor in accordance with the displacement of said auxiliary surface from said predetermined position.

EDUARD FISCHEL.